Aug. 16, 1927.
W. C. TODD
1,639,389
LAWN SPRINKLER
Filed March 24, 1927
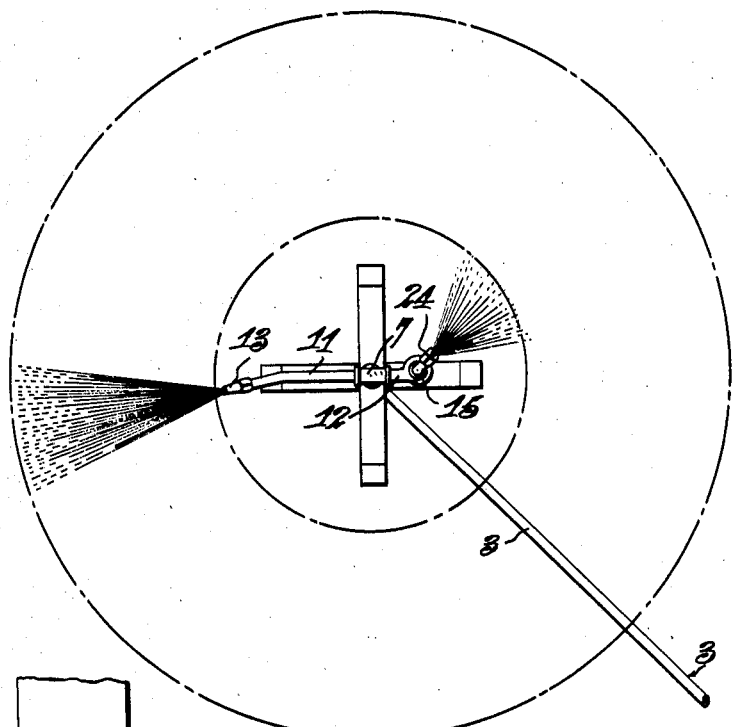
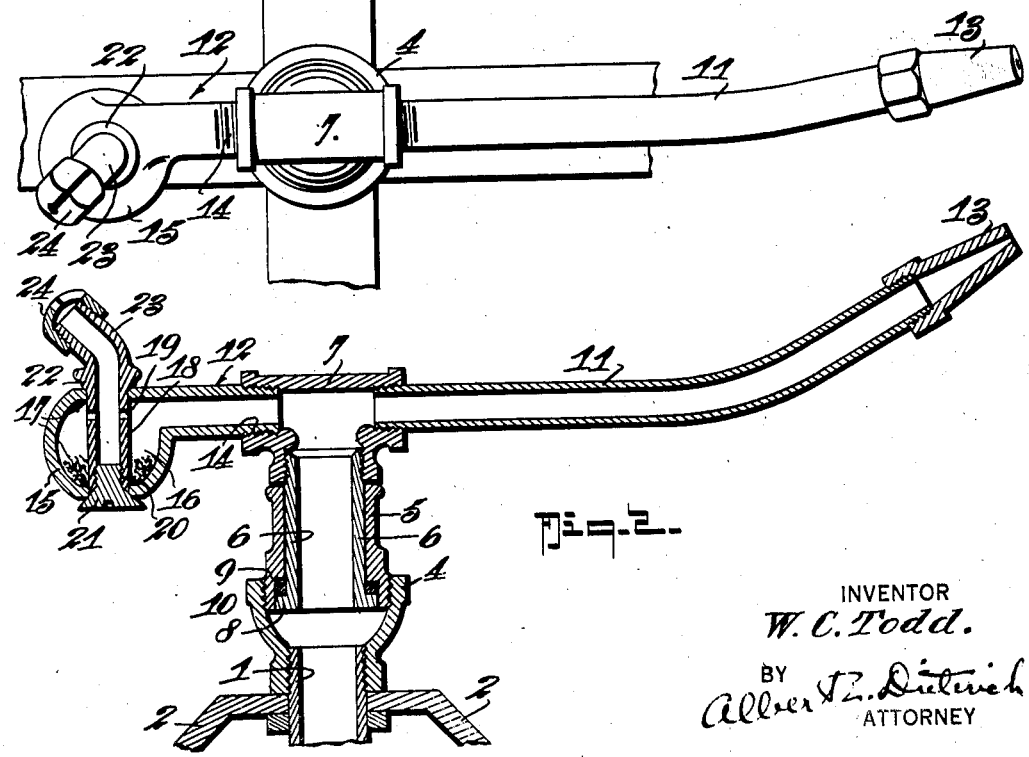
INVENTOR
W. C. Todd.
BY
Albert L. Dietrich
ATTORNEY Patented Aug. 16, 1927.

1,639,389

UNITED STATES PATENT OFFICE.

WILLIAM CHARLES TODD, OF VICTORIA, BRITISH COLUMBIA, CANADA.

LAWN SPRINKLER.

Application filed March 24, 1927. Serial No. 178,019.

The invention has for its object to provide certain new and useful improvements in lawn sprinklers of the reaction type wherein is provided a rotatable two-nozzled head, the individual nozzles of which each serve an individual concentric area, and resides in the provision of a more simple and economically manufactured device, so constructed and balanced that the same will operate as efficiently on an inclined bank as on a level base, in which friction is reduced to the minimum, in which the speed of rotation can be conveniently and quickly varied over a wide range, and in which means is provided for collecting sediment and effectively preventing interference with the most efficient flow of water through the control nozzle.

In its more detailed nature the invention resides in the provision, in a sprinkler of the type mentioned, of a bulbous balancing and sediment collecting body in which the short or control nozzle carrying arm terminates and which serves not only to perfectly balance the head on its rotative mounting but also to reduce friction to the minimum, serve as a sediment collector and nozzle stoppage preventer, and a means for mounting the control nozzle in an easily and quickly adjustable manner to facilitate accurate control of the speed of rotation of the sprinkler head.

With the above and other objects in view that will hereinafter appear, the invention still further resides in the novel details of construction, combination and arrangement of parts, all of which will be first fully described, then be particularly pointed out in the appended claims, reference being had to the accompanying drawing, in which:—

Figure 1 is a diagrammatic plan view illustrating the invention in use.

Figure 2 is a vertical longitudinal section of a portion of the rotatable sprinkler head.

Figure 3 is a plan view.

In the drawing, in which like numerals of reference indicate like parts in all the figures, 1 is the stand pipe mounted on a suitable base 2 and to which the water is supplied by hose connection 3 from a suitable source of water supply. The stand pipe 1 carries a nipple 4 having a tubular bearing portion 5 to rotatably receive the hollow stem 6 upon the upper end of which the cross coupling member or T head 7 is secured.

At its lower end the stem 6 is provided with a bearing flange 8 which is rotatable in the shouldered bearing 9 provided therefore in the lower end of the nipple 4, a suitable bearing washer 10 being interposed between the thrust or bearing surfaces to reduce friction and provide for greater evenness of rotation and quietness of operation of the rotatable head.

Long and short arms 11 and 12 respectively are secured in the open ends of the T head 7 and the said long arm is turned slightly upwardly and laterally and equipped at its end with a nozzle 13 hereinafter termed the main nozzle and which, when the device is in operation, is mounted to serve the outermost concentric area indicated by dot and dash lines on Figure 1 of the drawing, and because of its slight lateral position serves to impart rotation to the sprinkler head in direction according to the direction of such lateral projection. The direction of rotation will, of course, be opposite that to which the said nozzle is projected.

The short arm is composed of the threaded shank 14 which projects from the respective end of the T head 7 and terminates in a bulbous balancing head 15. The head 15 is hollow and it will be observed by reference to Figures 2 and 3 of the drawing that its center is positioned below and to one side (the side opposite that toward which the nozzle 13 is turned) of the center of the short arm 14, or in other words the path of travel of the water passing through the said short arm.

By thus shaping and positioning the head 15 the hollow interior thereof forms a whirl and sediment chamber 16 and also, by reason of such positioning and the proportioning of the said head, the same serves effectively to balance the head so that the said head will rotate as efficiently on an inclined base, as when mounted on the side of a bank, as on a perfectly flat base. Also by reason of providing the enlarged head the water passing through the relatively large body serves to add to the balancing feature and render unnecessary the use of as large an amount of metal in the construction of the balancing head as would otherwise be necessary.

A vertical bore 17 is projected centrally through the head 15 and serves to accommodate the hollow stem 18 of the control nozzle. The stem 18 is provided with water intake apertures 19 positioned at a high point in the chamber 16, the purpose for which will presently appear. The stem is internally threaded at its lower end as at 20 to receive the coni-form headed adjustment and sealing screw 21, and is equipped at its upper end with a coni-form seating head 22, the said heads 21 and 22 serving to secure the sleeve at any desired adjustment about its vertical axis and also to seal the bore 17 against water leakage.

The stem 18 terminates in its upper end in an angle bent head extension 23 projecting upwardly and laterally in direction opposite the direction of projection of the nozzle 13, and upon this head extension is secured the control nozzle 24. By use of the coni-form clamping members 21 and 22 the angle of lateral projection of the control nozzle 24 relatively to its carrying arm and the main nozzle 13 may be quickly and conveniently adjusted to vary the speed of rotation of the sprinkler head in any degree desirable.

By providing the bulbous head 15 with its whirl and sediment chamber 16 as the water passes through the said chamber a whirling motion is imparted thereto which provides for a more even distribution of the water to the control nozzle, and by reason of providing the sediment chamber so shaped and the apertures 19 at a high point in that chamber, the water in the lower portion of said chamber remains relatively quiet and permits settlement of particles which would otherwise tend to clog and reduce the efficiency of the control nozzle.

Thus the bulbous head 15 serves to perfectly balance the long arm of the sprinkler head. Being offset in the manner shown and described it provides for a more perfect balance of the sprinkler head than would be possible if it were in a straight line with the long arm and allows the machine to rotate perfectly in any position, even if the machine is held upside down.

The circular chamber 16 also provides for a more even distribution of water to the control nozzle and by its provision and arrangement passage of water into and through the chamber is rendered more quiescent thereby reducing friction.

From the foregoing description, taken in connection with the accompanying drawing, it is thought that the novel details of construction, the manner of use and the advantages of my invention will be readily apparent to those skilled in the art to which it relates.

What I claim is:

1. In sprinklers of the type stated, a stand pipe, a cross coupling rotatably mounted on the stand pipe, a long tubular arm secured to the coupling, a short tubular arm secured to the coupling, a main reaction nozzle secured to the long arm and directed angularly laterally thereof, a hollow balancing head on the end of the short arm having a vertical bore therethrough, a control nozzle comprising a hollow angularly directed portion and a hollow vertical shank, and means to adjustably secure the vertical shank in said bore against leakage and to vary the angular projection of the control nozzle relatively to said short arm.

2. In sprinklers of the type stated, a stand pipe, a cross coupling rotatably mounted on the stand pipe, a long tubular arm secured to the coupling, a short tubular arm secured to the coupling, a main reaction nozzle secured to the long arm and directed angularly laterally thereof, a hollow balancing head on the end of the short arm having a vertical bore therethrough, a control nozzle comprising a hollow angularly directed portion and a hollow vertical shank, and means to adjustably secure the vertical shank in said bore against leakage and to vary the angular projection of the control nozzle relatively to said short arm, said hollow vertical shank having an aperture communicating with the interior of the hollow head at a high point.

3. In sprinklers of the type stated, a stand pipe, a cross coupling rotatably mounted on the stand pipe, a long tubular arm secured to the coupling, a short tubular arm secured to the coupling, a main reaction nozzle secured to the long arm and directed angularly laterally thereof, a hollow balancing head on the end of the short arm having a vertical bore therethrough, a control nozzle comprising a hollow angularly directed portion and a hollow vertical shank, and means to adjustably secure the vertical shank in said bore against leakage and to vary the angular projection of the control nozzle relatively to said short arm, said hollow body being positioned with its center below and to one side of the path of travel of water through the small arm and to the side opposite the direction of projection of the main nozzle.

4. In sprinklers of the type stated, a stand pipe, a cross coupling rotatably mounted on the stand pipe, a long tubular arm secured to the coupling, a short tubular arm secured to the coupling, a main reaction nozzle secured to the long arm and directed angularly laterally thereof, a hollow balancing head on the end of the short arm having a vertical bore therethrough, a control nozzle comprising a hollow angularly directed portion and a hollow vertical shank, and means to adjustably secure the vertical shank in said bore against leakage and to vary the angular projection of the control nozzle relatively to said short arm, said hollow vertical shank having an aperture communicating with the interior of the hollow head at a high point, said hollow body being positioned with its center below and to one side of the path of travel of water through the small arm and to the side opposite the direction of projection of the main nozzle.

5. In sprinklers of the type stated, a stand pipe, a cross coupling rotatably mounted on the stand pipe, a long tubular arm secured to the coupling, a short tubular arm secured to the coupling, a main reaction nozzle secured to the long arm and directed angularly laterally thereof, a hollow balancing head on the end of the short arm having a vertical bore therethrough, a control nozzle comprising a hollow angularly directed portion and a hollow vertical shank, and means to adjustably secure the vertical shank in said bore against leakage and to vary the angular projection of the control nozzle relatively to said short arm, said hollow vertical shank having an aperture communicating with the interior of the hollow head at a high point, said hollow body being globular in shape and positioned with its center below and to one side of the path of travel of water through the small arm and to the side opposite the direction of projection of the main nozzle, said adjustable means comprising a coniform head on the vertical shank to oppose the globular head bore at one end, said vertical shank being internally threaded at its other end, and a securing screw to fit said internally threaded end and having a coniform head to oppose the globular head bore at its other end.

WILLIAM CHARLES TODD.